United States Patent [19]

Suzuki

[11] Patent Number: 5,423,647
[45] Date of Patent: Jun. 13, 1995

[54] STUD BOLT CLIP

[75] Inventor: Takashi Suzuki, Yokkaichi, Japan

[73] Assignee: Sumitomo Wiring Systems, Ltd., Tokyo, Japan

[21] Appl. No.: 190,831

[22] Filed: Feb. 2, 1994

[30] Foreign Application Priority Data

Mar. 1, 1993 [JP] Japan .................... 5-007856 U

[51] Int. Cl.$^6$ .................... F16B 21/18; F16B 37/08
[52] U.S. Cl. .................... 411/433; 411/437; 411/526; 411/970
[58] Field of Search ............. 411/433, 437, 512, 526, 411/970; 248/65, 74.1

[56] References Cited

U.S. PATENT DOCUMENTS

| | | | |
|---|---|---|---|
| 4,541,153 | 9/1985 | Schaty | 411/437 X |
| 4,728,236 | 3/1988 | Kraus | 411/437 |
| 4,840,333 | 6/1989 | Nakayama | |
| 4,999,019 | 3/1991 | Kraus | 411/437 X |
| 5,291,639 | 3/1994 | Baum et al. | 411/437 X |
| 5,302,070 | 4/1994 | Kameyama et al. | 411/437 |

FOREIGN PATENT DOCUMENTS 0145238 6/1985 European Pat. Off.
2118417 3/1989 Japan.

Primary Examiner—Neill R. Wilson
Attorney, Agent, or Firm—Sandler, Greenblum & Bernstein

[57] ABSTRACT

A stud bolt clip is provided with a tube having an oblong center. Provided inside the tube are opposing first claws projecting from the inside surfaces of the long sides of the tube, and opposing second claws projecting from the inside surfaces of the short sides of the tube. The second claws are flexible, and the projection of the second claws is greater than that of the first claws. The gaps between the inside ends of the first claws and the second claws are smaller than the outside diameter of the stud bolt shank. Thus, the stud bolt clips can be positively secured to the stud bolts even when there is a difference between the stud bolt pitch and the clip pitch by absorbing the irregular shift of the stud bolt in the tube.

11 Claims, 4 Drawing Sheets

5,423,647

STUD BOLT CLIP

BACKGROUND OF THE INVENTION

1. Field of the invention

The present invention relates to a stud bolt clip, and particularly to a stud bolt clip for securing a wire harness clamp or wire harness protector to a stud bolt projecting from a body panel while absorbing any offset there may be between the pitch of the stud bolts and the pitch of the clips.

2. Description of the prior art

Automotive wire harnesses are installed by first passing the wire harness through a conduit-like protector or attaching the wire harness with a tape to a narrow clamp band, and then securing this protector or clamp to the body panel while routing the harness through its required path.

This protector or clamp is most commonly attached to the body panels by engaging a clip, which is formed integrally to the protector or clamp, to a stud bolt welded to and projecting from the body panels.

To secure the clip to the stud bolt, a cylindrically shaped plastic clip 1 molded integrally to the protector is fit over the stud bolt 2. Plural claws 1a projecting from the inside circumference surface of the clip 1 are thus engaged between the peaks of the thread 2a spiraling around the outside surface of the stud bolt 2 shank.

The protector or clamp is secured at two points along its length using clips 1 and stud bolts 2. In some cases, the distance between the clips is offset slightly from the distance between the stud bolts projecting from the body panel. It is therefore necessary to secure one of the clips to the stud bolt while enabling the clip to slide and thereby absorb any offset in the pitch between clips and stud bolts.

As shown in FIGS. 8a and 8b, therefore, the prior art clip 1 provided on one end of the protector 3 is engaged with the stud bolt 2 at the specified position by means of four claws 1a projecting from the inside circumference of a normally round tube 1b. The clip 1' provided at the other end has a pair of long claws 1a' provided on the long sides of the oval tube 1b'. This pair of opposing claws 1a' secures the clip 1' to the stud bolt 2 while absorbing any difference in the stud bolt pitch and the clip pitch.

According to another prior art, as shown in FIGS. 9a and 9b, a long hole 4 is provided in the clips at both ends of the protector, opposing slotted claws 5 are provided on both sides of the long hole 4, and the stud bolt 2 is secured between the slotted claws 5. This is disclosed in Japanese Utility Model Laid-open Publication No. H 2-118417.

As described above, an offset between the stud bolt pitch and the corresponding clip pitch can be absorbed with the clips secured to the stud bolts by making the hole fit over the stud bolt long in the pitch absorption direction, providing long claws along the long side (i.e., along the pitch absorption direction) of the hole, and engaging the clip to the stud bolt at the appropriate position in the long hole.

The engagement force of this configuration is weak, however, because only two claws engage the stud bolt. When the clip is integrally molded with the protector or clamp from 10 polypropylene (PP) or some other plastic resin, the smoothness of the plastic further decreases the engagement force, and it becomes difficult to obtain the required engagement force (i.e., sufficient holding power to prevent easy separation of the clip from the stud bolt).

To this end, it is possible to design a movable clip mounted to a rail-shaped engaging member for moving the clip on the protector or clamp, and auxiliary clip is provided at a predetermined position of the engaging member, with this clip being secured to the stud bolt.

In this case, however, an extra assembly step is required for mounting the auxiliary clip, extra clerical work is required for inventory control of another part (the auxiliary clip), and overall cost is thus increased.

SUMMARY OF THE INVENTION

Therefore, an object of the present invention is to provide a stud bolt clip formed integrally to the protector for absorbing any offset in the clip-stud bolt pitch alignment and positively securing the clip to the stud bolt with sufficient holding power.

To achieve this object, a stud bolt clip according to the present invention is a clip integrally molded to both long sides of the installation member, which may be a wire harness protector or clamp, for securing the clip to a stud bolt projecting from the body panel or other installed-to member, and is characterized in that: at least one of the stud bolt clips provided on the installation member has a cylindrical body with a long rectangular hole formed in the lengthwise direction of the installation member; that first pair of claws having flexibility project from the opposing long sides of the tube where the distance between said sides is short; that second pair of claws having flexibility project from the opposing short sides of the tube where the distance between said sides is long; that the projection of the second claws is greater than the projection of the first claws; that the flexure of the second claws is greater than the flexure of the first claws; and that the gap between the corresponding inside ends of the first claws and the gap between the corresponding inside ends of the second claws are smaller than the outside diameter of the stud bolt shank.

By this arrangement, the flexure of the pair of second claws varies according to the position of the stud bolt inserted to the tube. Also, both the first and second claws are engaged by the peaks of the thread on the outside circumference of the stud bolt. Further, the clips can thus be secured to the stud bolts while absorbing any offset between the pitch of the stud bolts and the pitch of the clips.

The other of the clips securing the protector or clamp to the body panel comprises a round tube having a circular hole with four claws, each projecting an equal amount, provided at a ninety degree interval around the inside circumference of the tube.

It should be noted that both of the clips provided on the one protector or clamp may feature the pitch absorption structure described above.

Because of the long hole provided in the tube of the clip according to the present invention, the stud bolt can be inserted to the tube even when the stud bolt pitch is slightly off. When the position of the stud bolt inserted to the tube is offset from the standard stud bolt pitch and the distances to the stud bolt from the inside surfaces of the two short sides are therefore not equal, the flexure of the two second claws changes according to the corresponding distance to the stud bolt because the projection of the second claws is great, and both second claws are therefore engaged between the threads of the stud bolt.

The stud bolt is also engaged by the shorter first claws because the distance from the inside surfaces of both long sides to the stud bolt does not change even when the position of the stud bolt changes.

The required high holding power can also be obtained with this clip because the stud bolt is engaged from four directions by four claws even when the stud bolt is offset from the standard position.

BRIEF DESCRIPTION OF THE DRAWINGS

The present invention will become more fully understood from the detailed description given below and the accompanying diagrams wherein:

FIG. 9b is an enlarged plan view of the clip shown in FIG. 9a.

DESCRIPTION OF PREFERRED EMBODIMENTS

The preferred embodiment of a stud bolt clip according to the invention is described below with reference to the accompanying figures.

Figure 1:
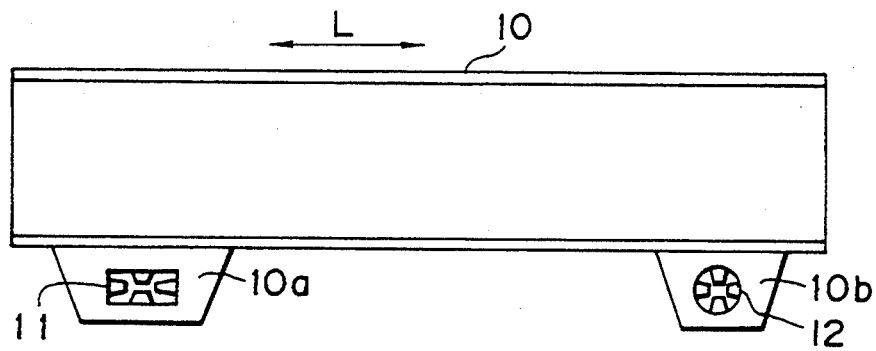
FIG. 1 is a plan view of the preferred embodiment of the invention.

As shown in FIG. 1, a carrier 10, such as a wire harness protector for carrying the wire harness, has two or more supports 10a and 10b which project at both ends of one long side as indicated by arrow L. First and second clip 11 and 12 are provided, respectively, at the supports 10a and 10b. The protector 10 may be in a conduit-like shape having a U-cross-sectional shape and is integrally molded from plastic with the supports 10a, 10b and clips 11, 12. The first clip 11 is characterized by the pitch absorption structure of the invention. The second clip 12 is for anchoring to a specified fixed position. Any offset from the standard stud bolt pitch is absorbed by the first clip 11 featuring the pitch absorption structure.

Figure 2A:
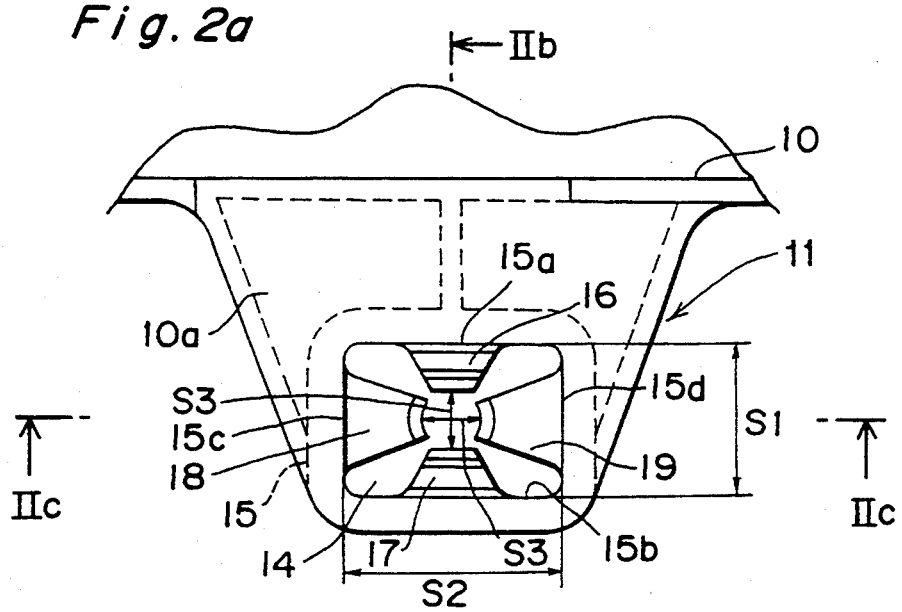
FIG. 2a is an enlarged plan view showing a detail of the clip 11 shown in FIG. 1, FIGS. 2b and 2c are cross sectional views taken along lines IIb—IIb and IIc—IIc, respectively, shown in FIG. 2a, FIG. 3a is an enlarged plan view showing a detail of the other clip 12 shown in FIG. 1.
Figure 2B:
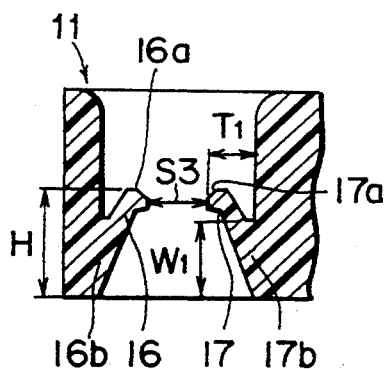
Figure 2C:
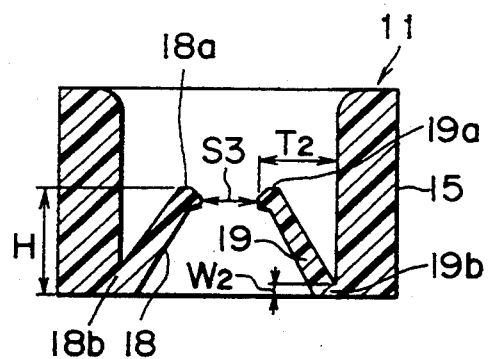
Figure 3A:
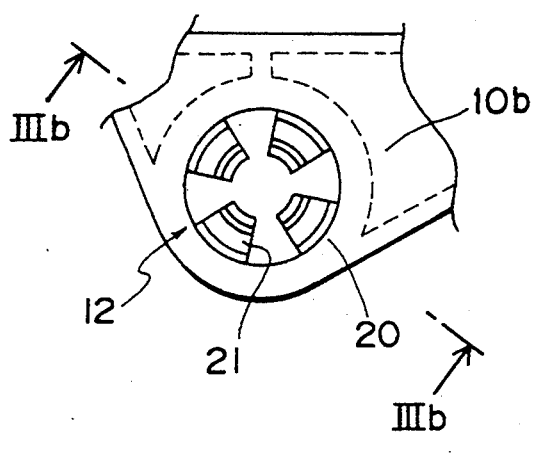
FIG. 3b is a cross sectional view taken along line IIIb—IIIb shown in FIG. 3a, FIG. 4 is a cross sectional view showing engagement of the clip 12 to the stud bolt.
Figure 3B:
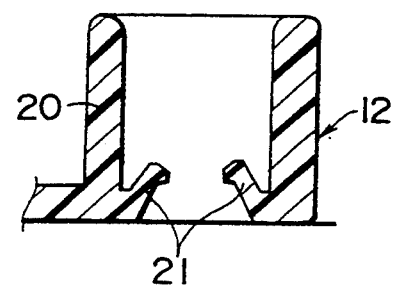

As shown in FIGS. 2a, 2b and 2c, the first clip 11 has a rectangular tube 15 projecting vertically through the support 10a. The long side of the rectangle tube 15 is approximately parallel to the long side L of the protector 10. Inside the tube 15 is defined by a long hole 14 with a rectangular cross section and both top and bottom ends open, and four claws 16, 17, 18 and 19, as described below.

First opposing claws 16 and 17 project from the middle of the inside surfaces of the long sides 15a and 15b, respectively. The distance between the long sides 15a and 15b is defined as S1. Second opposing claws 18 and 19 project from the middle of the inside surfaces of the short sides 15c and 15d, respectively. The distance between the short sides 15c and 15d is defined as S2. The relationship between S1 and S2 is S1<S2.

Both the first claws 16 and 17 and the second claws 18 and 19 project at an upward slope toward the center of the long hole 14 from the bottom of the tube 15. Claws 16, 17, 18 and 19 have, respectively, top end engaging member 16a, 17a, 18a, and 19a projecting horizontally from the end of each claw.

The thickness W1 of the base 16b, 17b of each first claw 16, 17 is large and the projection T1 of each first claw 16, 17 from the base 16b, 17b is short. The gap between the end engaging members 16a, 17a of the first claws is S3. Note that this gap S3 is smaller than the outside diameter of the shank of the stud bolt 2. 10 The thickness W2 of the base 18b, 19b of each second claw 18, 19 is small and the projection T2 of each second claw 18, 19 from the base 18b, 19b is long. The gap S3 between the end engaging members 18a, 19a of the second claws is the same as the gap S3 between the first claw end engaging members 16a, 17a. In other words, W1>W2 and T1<T2.

By reducing the thickness W2 of the base 18b, 19b of each second claw 18, 19 and increasing the claw projection T2, the second claws 18, 19 are more flexible than the first claws 16, 17, and can be made to bend easily.

In the preferred embodiment described above, the interfacial gap S1 between the long sides of the tube 15 is 9 mm, the gap S2 between the short sides is 13 mm, and the gap S3 between the end engaging members of both the first claws 16, 17 and the second claws 18, 19 is 3.6 mm. Note that for this application the outside shank diameter of the stud bolt 2 is 5 mm. The height H from the bottom to the top of both the first claws 16, 17 and the second claws 18, 19 is 6.2 mm.

Because the gap between the engagement members of the second claws 18, 19 is 3.6 mm relative to the 5 mm outside diameter of the stud bolt 2, the stud bolt 2 can be firmly engaged by both of the second claws 18, 19 even when the stud bolt 2 is offset up to 0.7 mm in the lengthwise direction L from the specified position.

Note that the absorbable pitch offset is determined by the outside diameter of the stud bolt and the gap between the ends of the second claws 18, 19. Specifically, if the outside diameter of the stud bolt is large and the gap S3 between the second claws is small, the absorbable pitch offset increases.

The second clip 12 for anchoring to a specified fixed position has four identically shaped claws 21 at a ninety degree interval angle on the inside circumference of the circular tube 20.

Figure 4:
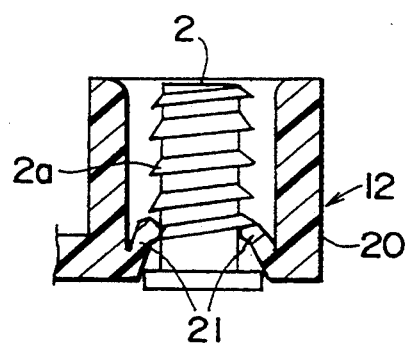

The protector 10 as described above is attached to the body panel in the following steps. The protector 10 is attached by first securing the fixed position clip 12 to the stud bolt 2 projecting from the body panel. As shown in FIG. 4, the stud bolt 2 is inserted to the clip 12 from the open bottom end thereof. In actual practice, however, the clip 12 is pushed over the stud bolt 2 because the stud bolt 2 is already fixed to the body panel.

A thread 2a is provided on the outside surface of the stud bolt 2. The thread 2a bends the claws 21 as the stud bolt 2 is inserted (i.e., the tube 20 is fit over the stud bolt 2), and at the specified position the claws 21 are engaged between the thread 2a ridges on four sides of the stud bolt 2.

Figure 5:
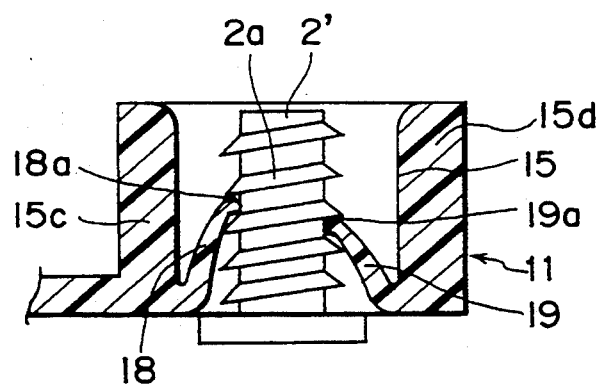
FIG. 5 is a cross sectional view showing engagement of the clip 11 to the stud bolt.

The pitch absorption clip 11 is secured to the stud bolt 2' as shown in FIG. 5.

When the distance between the stud bolts 2 and 2' is different from the distance between the first and second clips 11 and 12, the second stud bolt 2' is inserted to the tube 15 offset slightly from the center of the clip 11. Specifically, the stud bolt 2' is inserted not to the center between the two short sides 15c and 15d, but offset slightly toward one of the short sides (short side 15c in the example shown in FIG. 5).

At this time, the second claw 18 projecting from the short side 15c bends and is engaged between the thread 2a ridges of the stud bolt 2'. The other second claw 19 projecting from the other short side 15d is similarly engaged between the thread 2a ridges of the stud bolt 2' by means of the end engaging member 19a even when the stud bolt 2' is offset to the first short side 15c because the end engaging member 19a is designed to project to the outside surface of the shank of the stud bolt 2' inserted at the specified position.

The claws are made from a resilient material, such as a plastic resin and can therefore be easily extended but not easily retracted because of the high compression resistance of the material. When the stud bolt 2' is inserted, the second claw 18 is therefore easily pushed up because of its large projection T2, and the stud bolt 2' is easily inserted. After the claws are engaged by the stud bolt thread, however, the claws must be retracted to remove the clip from the stud bolt. As a result, the clip and stud bolt cannot be easily separated even at the one second claw 19 insofar as the end engaging member 19a thereof is engaged in the stud bolt thread.

The first claws 16, 17 projecting from the long sides 15a, 15b are also engaged by the thread 2a of the stud bolt 2' with a strong engaging force, and the first clip 11 structured to absorb pitch differences can therefore be positively secured to the stud bolt 2'.

Figure 8A:
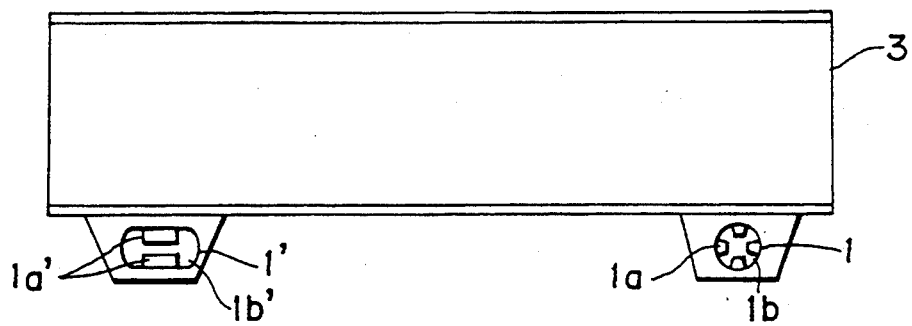
FIG. 8a is a plan view of a protector having a prior art clip and pitch absorption structure, 10

Tests were carried out to compare the separation force of the first clip 11 structured to absorb pitch differences according to the present invention with that of the conventional clip 1' structured to absorb pitch differences by means of only two claws as shown in FIG. 8. Note that the conventional clip 1' and the clip 11 of the present invention used in this test differ only by the provision of the second claws 18, 19 in the clip 11 of the invention.

Figure 6:
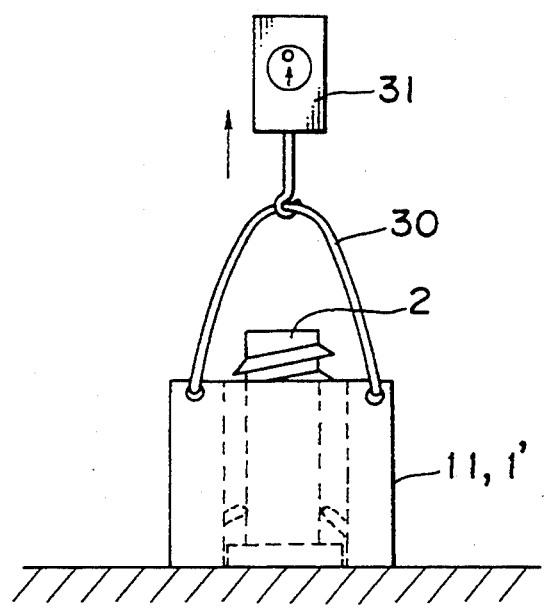
FIG. 6 is a diagrammatic view showing the test apparatus.
Figure 7:
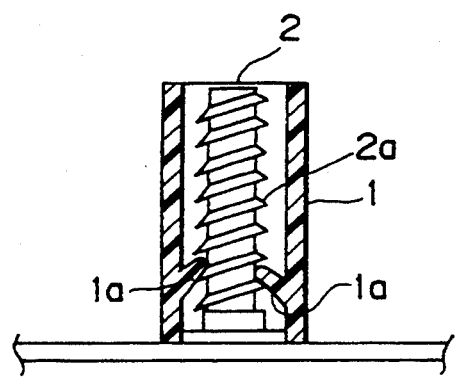
FIG. 7 is a cross sectional view showing engagement of the prior art clip 1 to the stud bolt.

The test apparatus is illustrated in FIG. 6. Both clips 11 and 1' were separately secured to a stud bolt 2 welded to a fixed plate. A line 30 was attached at four points to each clip 11 and 1'. The line 30 was pulled in the direction of the arrow, and the tensile force was measured by the gauge 31.

The loads required to separate each clip 11 and 1' from the stud bolt 2 in two trials are shown in Table 1 below.

TABLE 1

|  | 1st Trial | 2nd Trial |
|---|---|---|
| Clip 11 | 14.5 kg | 15.9 kg |
| Clip 1' | 8.3 kg | 9.0 kg |

As will be obvious from the above description, a clip according to the present invention is a tubular clip with an oblong center hole comprising opposing first claws projecting from the long sides, between which the gap is short, and opposing second claws projecting from the short sides, between which the gap is long, thereof. The projection of the second claws is long to achieve greater flexibility. As a result, when a stud bolt is inserted to an off-center position lengthwise to the oblong hole due to an offset in the stud bolt pitch, the stud bolt can still be engaged by both second claws. Because the first claws also engage the stud bolt, the stud bolt is firmly engaged on four sides even when the stud bolt pitch is offset.

As a result, the clips can engage the stud bolt with a strong holding power while absorbing variations in the stud bolt pitch.

In addition, because these pitch absorption clips are integrally molded from resin with the protector or clamp, assembly is easier, and costs are therefore reduced, when compared with clamps using separate clips to be assembled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stud bolt clip integrally molded to an installation member for securing to a stud bolt having thread ridges and projecting from a panel, said stud bolt clip comprising:

a tube formed by long sides and short sides for defining a rectangular hole extending from a bottom opening to a top opening of said tube;

a first pair of claws projecting from said long sides of the tube and pointing towards said top opening, the ends of said first pair of claws being opened by a first predetermined distance;

a second pair of claws projecting from said short sides of the tube and pointing towards said top opening, the ends of said second pair of claws being opened by a second predetermined distance, a projection length of said second pair of claws being greater than a projection length of said first pair of claws, whereby when a stud bolt is inserted into said tube, said stud bolt clip is secured to said stud bolt by engagement of said first and second pairs of claws between the thread ridges of the stud bolt;

wherein a thickness of bases from which said first pair of claws extend are thicker than a thickness of bases from which said second pair of claws extend.

2. The stud bolt clip as claimed in claim 1, wherein said first and second predetermined distances are substantially the same.

3. The stud bolt clip as claimed in claim 1, wherein said first and second pairs of claws are formed of resilient material.

4. The stud bolt clip as claimed in claim 1, wherein said first and second predetermined distances are both smaller than an outside diameter of a shank of said stud bolt.

5. An installation member for installing an elongated object and being secured to a panel having at least first and second stud bolts projecting from said panel, said installation member comprising:

an elongated carrier member for carrying said elongated object therein;

a first stud bolt clip integrally formed to said carrier member for being hooked to said first stud bolt; and a second stud bolt clip integrally formed to said carrier member for being hooked to said second stud bolt, said second stud bolt clip comprising:

a tube formed by long sides and short sides for defining a rectangular hole extending from a bottom opening to a top opening of said tube;

a first pair of claws projecting from said long sides of the tube and pointing towards said top opening, the ends of said first pair of claws being opened by a first predetermined distance;

a second pair of claws projecting from said short sides of the tube and pointing towards said top opening, the ends of said second pair of claws being opened by a second predetermined distance, a projection length of said second pair of claws being greater than a projection length of said first pair of claws, whereby when said second stud bolt is inserted into said tube, said second stud bolt clip is secured to said stud bolt by engagement of said first and second pairs of claws between the thread ridges of the stud bolt.

6. The installation member as claimed in claim 5, wherein said long sides of said tube extend approximately in the same direction as a direction in which said elongated carrier member extends.

7. The installation member as claimed in claim 5, wherein said long sides of said tube extends approximately in the same direction as a line between said first and second stud bolts.

8. A stud bolt clip integrally molded to an installation member for securing to a stud bolt having thread ridges and projecting from a panel, said stud bolt clip comprising:

a tube formed by long sides and short sides for defining a rectangular hole extending from a bottom opening to a top opening of said tube;

a first pair of claws projecting from said long sides of the tube and pointing towards said top opening, the ends of said first pair of claws being opened by a first predetermined distance;

a second pair of claws projecting from said short sides of the tube and pointing towards said top opening, the ends of said second pair of claws being opened by a second predetermined distance, a projection length of said second pair of claws being greater than a projection length of said first pair of claws, whereby when a stud bolt is inserted into said tube, said stud bolt clip is secured to said stud bolt by engagement of said first and second pairs of claws between the thread ridges of the stud bolt;

wherein each claw of said first and second pairs of claws has an engagement member projecting towards a center of said rectangular hole.

9. The stud bolt clip of claim 8, wherein said first and second predetermined distances are substantially the same.

10. The stud bolt clip of claim 8, wherein said first and second pairs of claws are formed of resilient material.

11. The stud bolt clip of claim 8, wherein said first and second predetermined distances are both smaller than an outside diameter of a shank of said stud bolt.

* * * * *

UNITED STATES PATENT AND TRADEMARK OFFICE
CERTIFICATE OF CORRECTION

PATENT NO. : 5,423,647
DATED : June 13, 1995
INVENTOR(S) : Takashi SUZUKI

It is certified that error appears in the above-indentified patent and that said Letters Patent is hereby corrected as shown below:

On the title page in section [73] Assignee, line 2, "Tokyo, Japan" should be ---Yokkaichi City, Japan---.

On the title page in section [75] Inventor, line 1, "Yokkaichi, Japan" should be ---Yokkaichi City, Japan---.

At column 3, line 37, after "structure," delete "10".

Figure 8B:
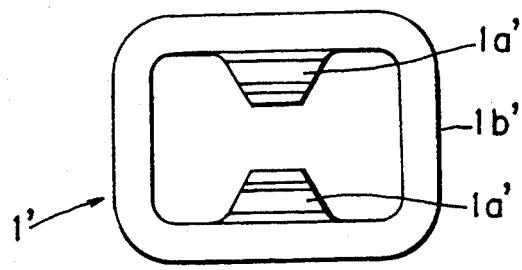
FIG. 8b is an enlarged plan view of the clip 1' shown in FIG. 8a, FIG. 9a is a perspective view showing a another protector having a different prior art clip.
Figure 9A:
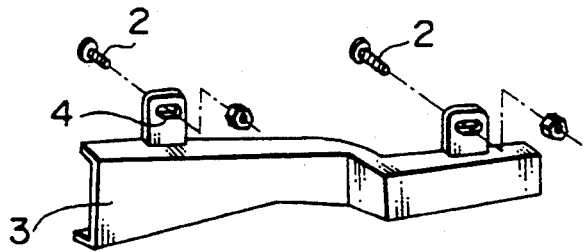
Figure 9B:
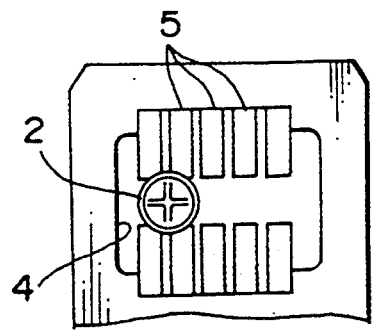

At column 3, line 37, "FIG. 8b is an" should start on line 38.

At column 3, line 39, after "showing" delete "a".

At column 4, line 22, after "bolt 2." delete "10".

At column 4, line 22, "The" should be --- T h e --- starting on line 23.

Signed and Sealed this

First Day of July, 1997

Attest:

BRUCE LEHMAN

Attesting Officer

Commissioner of Patents and Trademarks